(12) United States Patent
Chandan et al.

(10) Patent No.: US 8,905,204 B2
(45) Date of Patent: Dec. 9, 2014

(54) ROLLER BEARING HAVING AN ELECTRIC SOLENOID POWERED BRAKE

(75) Inventors: Raj K. Chandan, Etobicoke (CA); Varun Chandan, Etobicoke (CA); Wayne M. Benson, Newmarket (CA)

(73) Assignee: Amico Clinical Solutions, Richmond Hill (CA)

( * ) Notice: Subject to any disclaimer, the term of this patent is extended or adjusted under 35 U.S.C. 154(b) by 617 days.

(21) Appl. No.: 13/157,619

(22) Filed: Jun. 10, 2011

(65) Prior Publication Data

US 2011/0303499 A1 Dec. 15, 2011

Related U.S. Application Data

(60) Provisional application No. 61/353,404, filed on Jun. 10, 2010.

(51) Int. Cl.

| | |
|---|---|
| *F16D 51/00* | (2006.01) |
| *B60T 13/74* | (2006.01) |
| *F16C 41/00* | (2006.01) |
| *F16C 11/10* | (2006.01) |
| *F16D 49/16* | (2006.01) |
| *F16C 17/04* | (2006.01) |
| *F16D 121/22* | (2012.01) |
| *F16D 125/66* | (2012.01) |

(52) U.S. Cl.
CPC .............. *B60T 13/741* (2013.01); *F16C 41/001* (2013.01); *F16D 2121/22* (2013.01); *F16C 11/103* (2013.01); *F16D 49/16* (2013.01); *F16C 2316/10* (2013.01); *F16D 2125/66* (2013.01); *F16C 17/04* (2013.01)
USPC .......... 188/343; 188/163; 188/166; 74/490.01

(58) Field of Classification Search
USPC ................. 74/490.01–490.05; 383/590, 627; 188/75, 76, 78, 166, 167, 171, 343; 384/590, 627

See application file for complete search history.

(56) References Cited

U.S. PATENT DOCUMENTS

| | | | | |
|---|---|---|---|---|
| 3,831,720 | A | * | 8/1974 | Williams ....................... 188/343 |
| 5,103,944 | A | * | 4/1992 | Severinsson .................. 188/343 |

(Continued)

*Primary Examiner* — Troy Chambers
*Assistant Examiner* — Alexander Vu
(74) *Attorney, Agent, or Firm* — Jonathan M. D'Silva; MacDonald, Illig, Jones & Britton LLP (57) ABSTRACT

What is presented is a mechanical arm assembly with a novel roller thrust bearing. The mechanical arm assembly comprises a first arm having a first end and a second end. A first roller thrust bearing is mounted to the first end and to a ceiling. A second roller thrust bearing mounted to the second end. Each roller thrust bearing comprises a first bearing body and a second bearing body able to rotate relative to each other. Each roller thrust bearing has a solenoid powered brake comprising two brake shoes each with a high friction brake pad mounted to a hinge body affixed to the first bearing body, a brake drum mounted to the second bearing body, a tension spring pushing the brake shoes against the brake drum, and a mechanism for disengaging the brake shoes from the brake drum. The mechanism comprises a slider body with space for two pins, two ball bearings, and a plunger with sloped surfaces on one end and a mounting provision on the other. A solenoid is attached to the mounting provision. The sloped surface is shaped such that when the solenoid is activated and the solenoid moves the plunger, the sloped surface pushes the ball bearings apart which pushes against the pins apart which in turn pushes against the brake shoes thereby disengaging the brake shoes from the brake drum and permitting the first bearing body to rotate relative to the second bearing body.

8 Claims, 10 Drawing Sheets

(56) References Cited

U.S. PATENT DOCUMENTS

| | | | |
|---|---|---|---|
| 5,337,878 A * | 8/1994 | Mehlert et al. | 198/323 |
| 5,355,978 A * | 10/1994 | Price et al. | 188/264 D |
| 5,740,891 A * | 4/1998 | Song | 188/326 |
| 5,785,157 A * | 7/1998 | Scott et al. | 188/156 |
| 6,324,934 B1 * | 12/2001 | Monaghan | 74/490.04 |
| 6,374,953 B1 * | 4/2002 | Casas | 187/399 |
| 7,367,245 B2 * | 5/2008 | Okazaki et al. | 74/490.04 |
| 2004/0265112 A1 * | 12/2004 | Nieuwenhuis | 414/744.5 |
| 2007/0261928 A1 * | 11/2007 | Charmat | 188/79.51 |
| 2009/0178506 A1 * | 7/2009 | Yamamoto et al. | 74/490.03 |
| 2009/0205381 A1 * | 8/2009 | Ho | 70/57.1 |
| 2010/0012444 A1 * | 1/2010 | Flodin et al. | 188/78 |
| 2010/0065999 A1 * | 3/2010 | Bereznicki et al. | 269/59 |

* cited by examiner

ROLLER BEARING HAVING AN ELECTRIC SOLENOID POWERED BRAKE

This application claims benefit of U.S. Provisional Application No. 61/353,404 filed on Jun. 10, 2010, which is incorporated herein by reference.

BACKGROUND

Mechanical arms are used extensively in hospitals and clinics to conveniently mount and locate pieces of equipment where a medical professional may make the best use of the equipment. The mechanical arms allow the user to position a mounted piece of equipment for better access or to move it out of the way when not in use but still allow it to remain in a relative location. Mechanical arms may generally be mounted to a wall or a ceiling. The invention relates to ceiling mounted mechanical arms. Equipment, such as monitors, sensors, or other medical devices is mounted to one end. A number of arms are mounted between the ceiling and the equipment and a number of roller thrust bearings are used to enable the equipment to be moved and positioned relative to the ceiling. What is presented is an improved roller thrust bearing for positioning the arms of the mechanical arm assemblies.

SUMMARY

The invention disclosed relates to mechanical arm assemblies comprising of at least a first arm having a first end and a second end and a first roller thrust bearing mounted to the first end and to a ceiling and at least a second roller thrust bearing mounted to the second end. A second arm or a piece of equipment may be mounted to the second roller thrust bearing. Mechanical arm assemblies may have any number of arms between the ceiling and the piece of equipment. Roller thrust bearings would be interposed between each arm in the same manner.

Each roller thrust bearing has a first bearing body and a second bearing body able to rotate relative to each other. Each roller thrust bearing has a solenoid powered brake comprising two brake shoes each with a high friction brake pad mounted to a hinge body affixed to the first bearing body. A brake drum is mounted to the second bearing body. At least one high tension spring pushes the brake shoes against the brake drum. Each roller thrust bearing includes a mechanism for disengaging the brake shoes from the brake drum. This mechanism includes a slider body having space for pins, bearing balls, and a plunger with sloped surfaces on one end and a mounting provision on the other. A solenoid is attached to the mounting provision of the plunger. The sloped surface of the plunger is shaped such that when the solenoid is activated, it pushes the plunger against the bearing balls, the sloped surface pushes the bearing balls apart which, in turn, pushes against the pins which in turn pushes against the brake shoes. Thereby disengaging the brake shoes from the brake drum and permitting the first bearing body to rotate relative to the second bearing body.

Those skilled in the art will realize that this invention is capable of embodiments that are different from those shown and that details of the devices and methods can be changed in various manners without departing from the scope of this invention. Accordingly, the drawings and descriptions are to be regarded as including such equivalent embodiments as do not depart from the spirit and scope of this invention.

BRIEF DESCRIPTION OF DRAWINGS

For a more complete understanding and appreciation of this invention, and its many advantages, reference will be made to the following detailed description taken in conjunction with the accompanying drawings.

DETAILED DESCRIPTION

Referring to the drawings, some of the reference numerals are used to designate the same or corresponding parts through several of the embodiments and figures shown and described. Corresponding parts are denoted in different embodiments with the addition of lowercase letters. Variations of corresponding parts in form or function that are depicted in the figures are described. It will be understood that variations in the embodiments can generally be interchanged without deviating from the invention.

Figure 1:
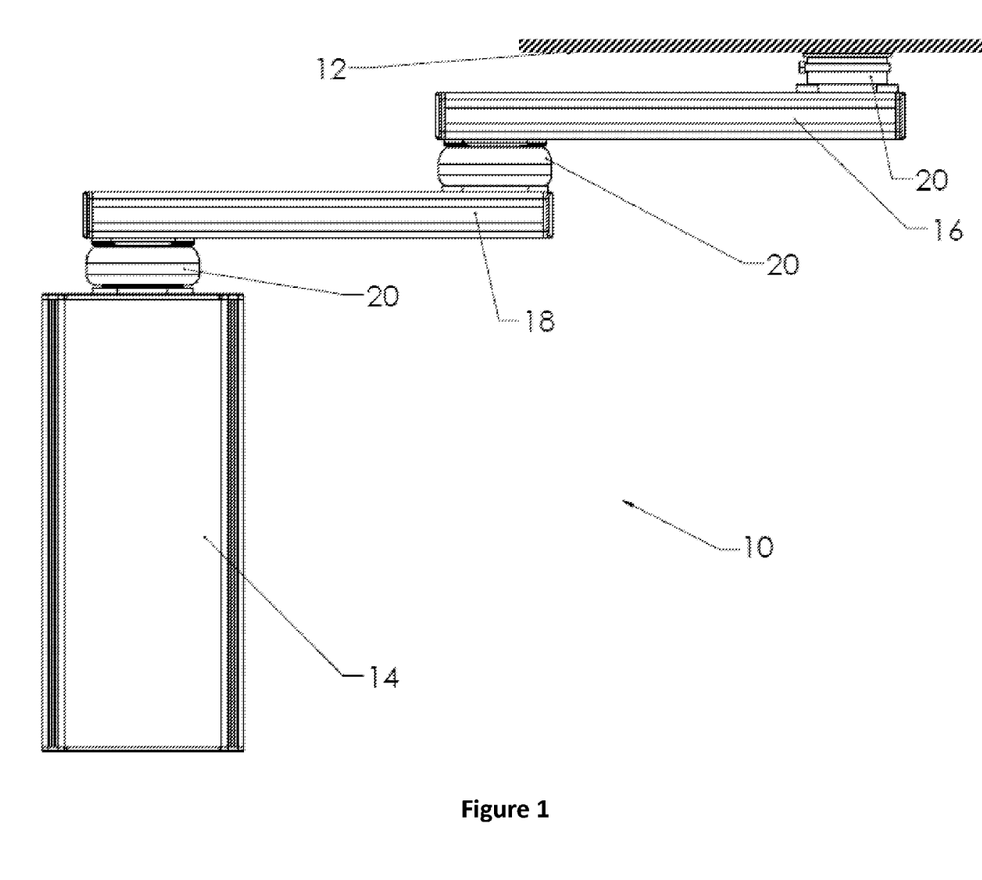
FIG. 1 is a side view of a mechanical arm assembly having two arms mounted to a ceiling with a piece of equipment attached including three roller thrust bearings.

FIG. 1 shows a mechanical arm assembly 10 for medical devices and equipment. The mechanical arm assembly 10 comprises a series of arms that are mounted between the ceiling 12 and a piece of equipment 14. In the example shown in FIG. 1, the mechanical arm assembly 10 comprises two arms: a first arm 16 mounted to the ceiling 12 and a second arm 18 mounted to the piece of equipment 14, with the first arm 16 mounted to the second arm 18. It will be understood that the actual number of arms may vary for the particular application—some mechanical arm assemblies may have only a single arm, while others may have three or more arms. The mechanical arm assembly 10 allows users to position the piece of equipment 14 around the room in which it is installed to the extent allowable for by the rotation of the various arms relative to the ceiling and each other. Movement of the arms and the piece of equipment 14 is accomplished by way of the roller thrust bearings 20 to which each arm and the piece of equipment is mounted and to which the entire mechanical arm assembly 10 is mounted to the ceiling 12.

Figure 2:
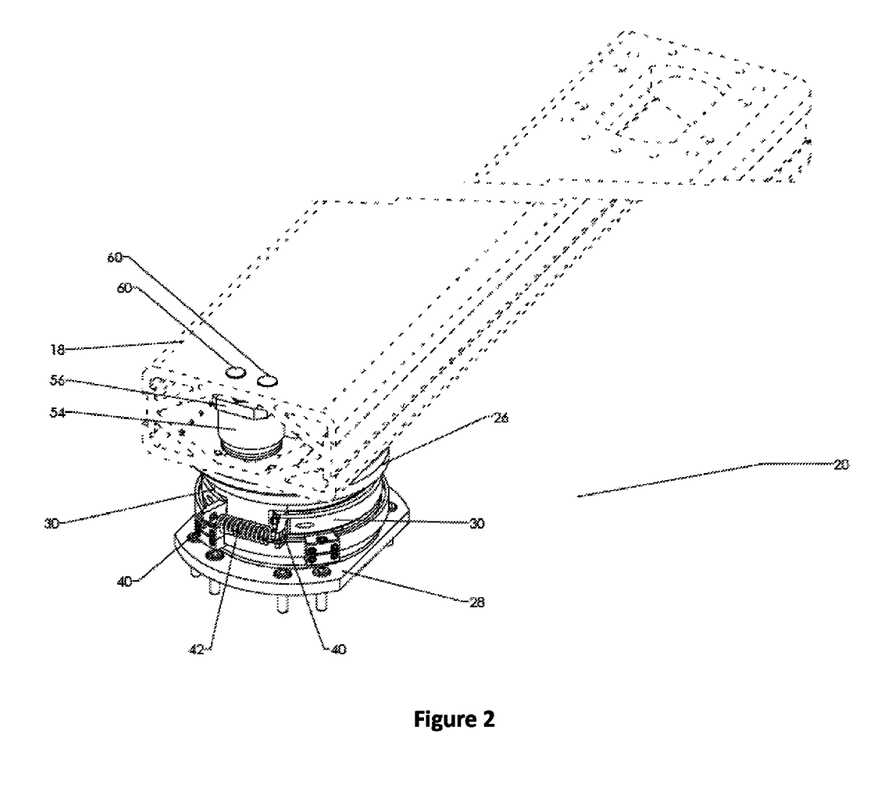
FIG. 2 is a close up of a roller thrust bearing mounted to an arm of the mechanical arm assembly as shown in FIG. 1.

As can be best understood by comparing FIG. 1 and FIG. 2, FIG. 2 shows a close up of the roller thrust bearing 20 mounted between the second arm 18 and the piece of equipment 14 (not shown in FIG. 2). The roller thrust bearings 20 are identical whether they connect the first arm 16 to the second arm 18, the first arm 16 to the ceiling 12, or the second arm 18 to the piece of equipment 14.

Figure 3:
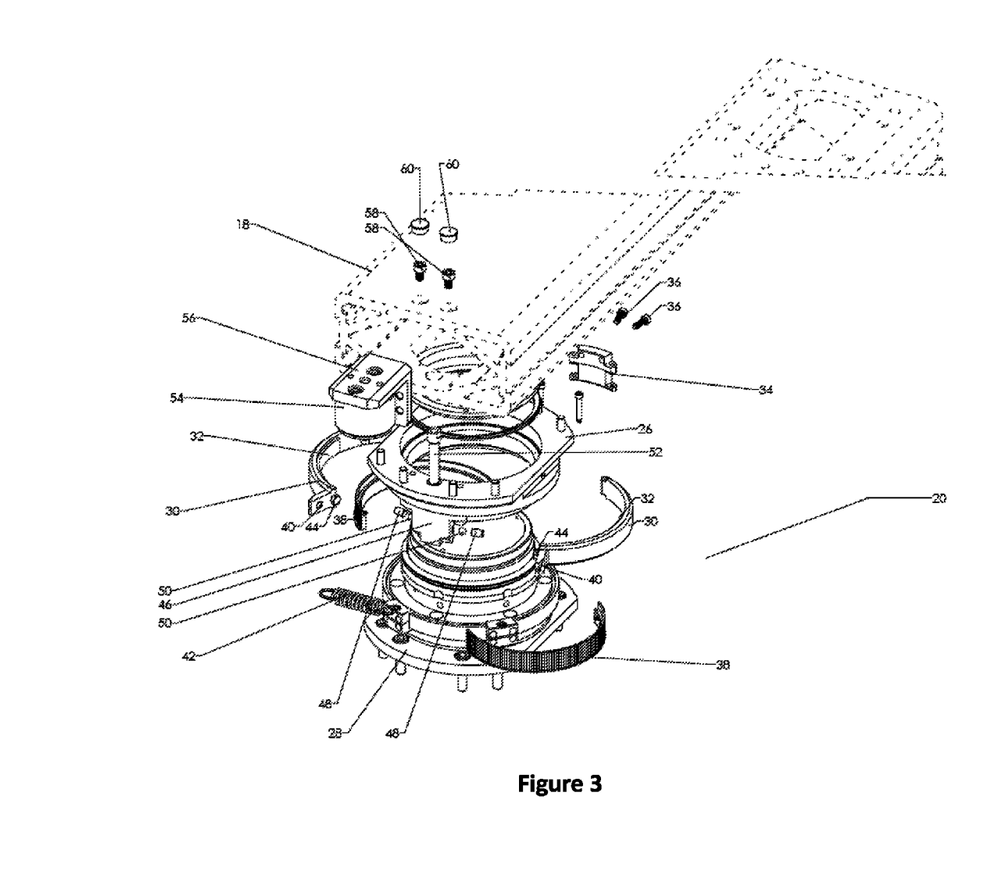
FIG. 3 is an exploded view of the roller thrust bearing of FIG. 2.

FIG. 3 shows an exploded view of the roller thrust bearing 20 of FIG. 2. The roller thrust bearing 20 comprises a first bearing body 26 and a second bearing body 28 each able to rotate relative to each other. The first bearing body 26 is located above the second bearing body 28. Two brake shoes 30, each with a high friction brake pad 32, are mounted at a first end to a hinge body 34. The hinge body 34 is affixed by screws 36 to the first bearing body 26. A brake drum 38 is mounted to the second bearing body 28. When the roller thrust bearing 20 is assembled, the brake shoes 30 fit over brake drum 38.

The second end of each brake pad has a spring mounting hole 40 and a pin pad 44. A high tension spring 42 is mounted to each spring mounting hole 40 pulling the brake shoes 30 together and pressing the brake pads 32 against the brake drum which locks the first bearing body 26 against the second bearing body 28 and prevents the rotation of the first bearing body 26 relative to the second bearing body 28. In pulling the brake shoes 30 together, the high tension spring 42 also pulls the pin pad 44 on each brake shoe 30 against the slider body 46 and, more specifically, each pin pad 44 is pulled against a pin 48 that is positioned in the slider body 46 to sit against each pin pad 44 on each brake shoe 30.

Figure 4:
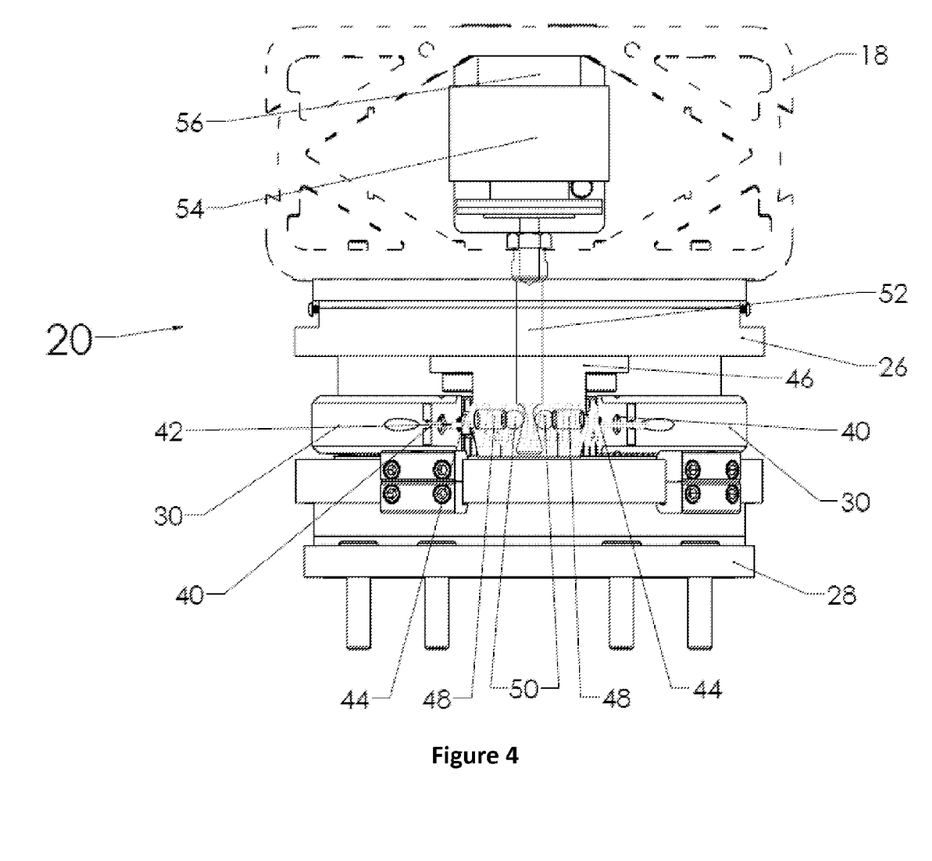
FIG. 4 is a side cross-sectional view of the slider body of the roller thrust bearing of FIG. 3 showing the plunger fully extended when the solenoid is unpowered.

FIG. 4 shows a section view of the slider body 46. As can be best understood by comparing FIG. 3 and FIG. 4, each pin 48 is pushed against a ball bearing 50 within the slider body 46. The ball bearings 50 are in turn pushed against the plunger 52. The plunger 52 has sloped surfaces on the end against which the ball bearings 50 press and a mounting provision on the other to which the plunger 52 is attached to a solenoid 54. The solenoid 52 is mounted above the first bearing body 26 with a mounting bracket 56 with screws 58 which may be covered with decorative caps 60 for aesthetic purposes.

Generally the roller thrust bearings 20 are locked to keep the arms and equipment in place. As will be described in more detail below, the roller thrust bearings 20 may be unlocked and moved by, for example, activating a circuit that releases the roller thrust bearings 20 to allow movement of the selected arm or piece of equipment. The unlocking of the roller thrust bearing 20 is best understood by comparing FIGS. 4, 5, and 6. As shown in FIG. 4, the default position for each roller thrust bearing 20 is with the solenoid 54 unpowered and the plunger 52 positioned such that the ball bearings 50 are pressed against the narrowest part of the slope of the plunger 52. This occurs because the high tension spring 42 pulls the brake shoes 30 together and the pin pads 44 push against the pins 48 which in turn push against the ball bearings 50. In this position the pins 48 are in their closest position against the ball bearings and the brake shoes 30 and brake pads 32 are the tightest against the brake drum 38 thereby locking the roller thrust bearing 20 in place.

Figure 5:
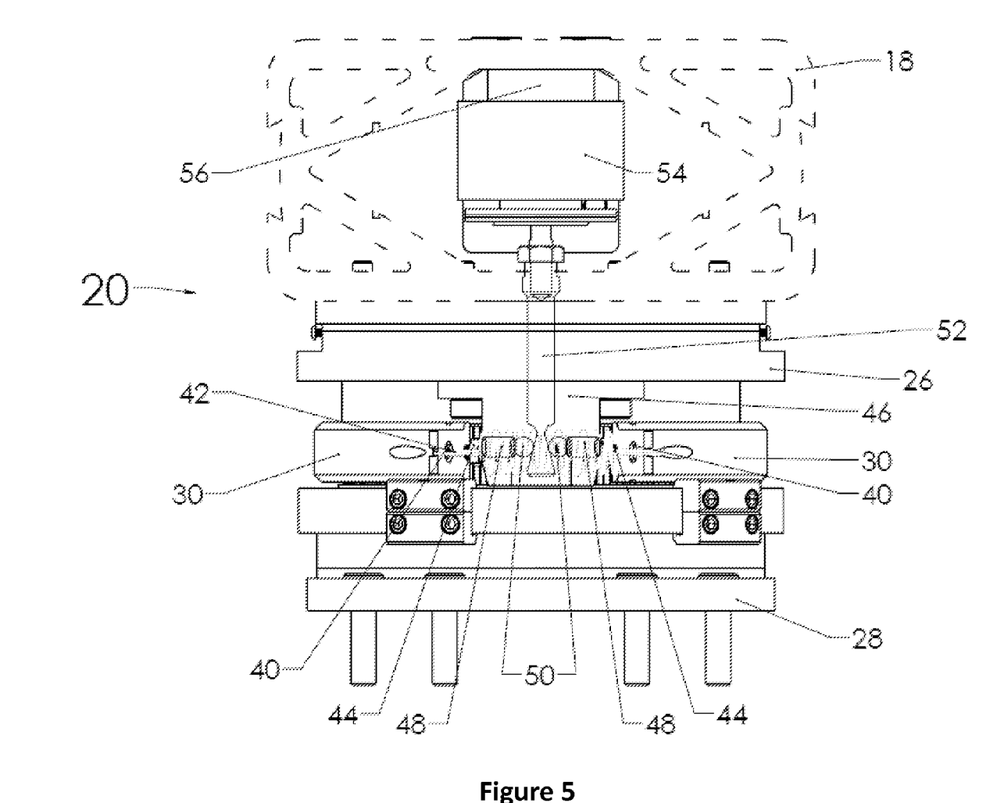
FIG. 5 is a side cross-sectional view of the slider body of the roller thrust bearing of FIG. 3 showing the plunger partially pulled back when the solenoid is powered.
Figure 6:
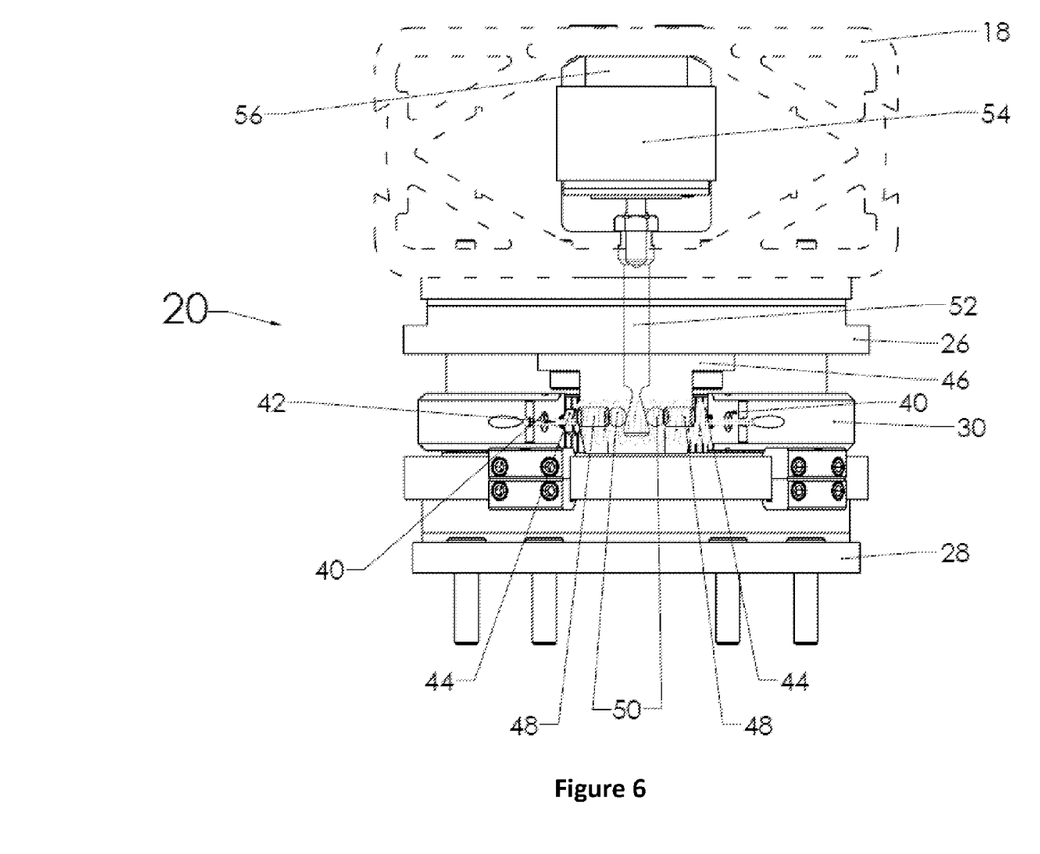
FIG. 6 is a side cross-sectional view of the slider body of the roller thrust bearing of FIG. 3 showing the plunger fully retracted when the solenoid is powered and the brakes are fully released.

As shown in FIG. 5, when the solenoid 54 is activated, the plunger 52 is pulled upward and a wider part of the slope of the plunger 52 pushes the ball bearings 50 outwards. This in turn pushes the pins 48 against the pin pads 44 which push the brake shoes 30 apart and the brake pads 32 away from the brake drums 38. As shown in FIG. 6, when the solenoid 54 completes its cycle and the brakes are fully released, the plunger 52 is fully retracted and the ball bearings 50 pushed outwards as far as they can go. The pins 48 are also pushed out as far as they can go, and in turn so are the brake shoes 30. The brake pads 32 are also pushed away and entirely disengaged from the brake drums 38 permitting the first bearing body 26 and the second bearing body 28 to freely rotate relative to each other.

When the solenoid 54 is deactivated, the plunger 52 is pushed back down so that the narrowest part of its sloped surface faces the ball bearings 50. The tension in the high tension spring 42 pulls the brake shoes 30 together and the pin pads 44 push against the pins 48 which in turn push against the ball bearings 50. The tension in the high tension spring 42 pulling the brake shoes 30 together also pushes the brake pads 32 against the brake drums 38 locking the first bearing body 26 against the second bearing body 28.

Figure 7:
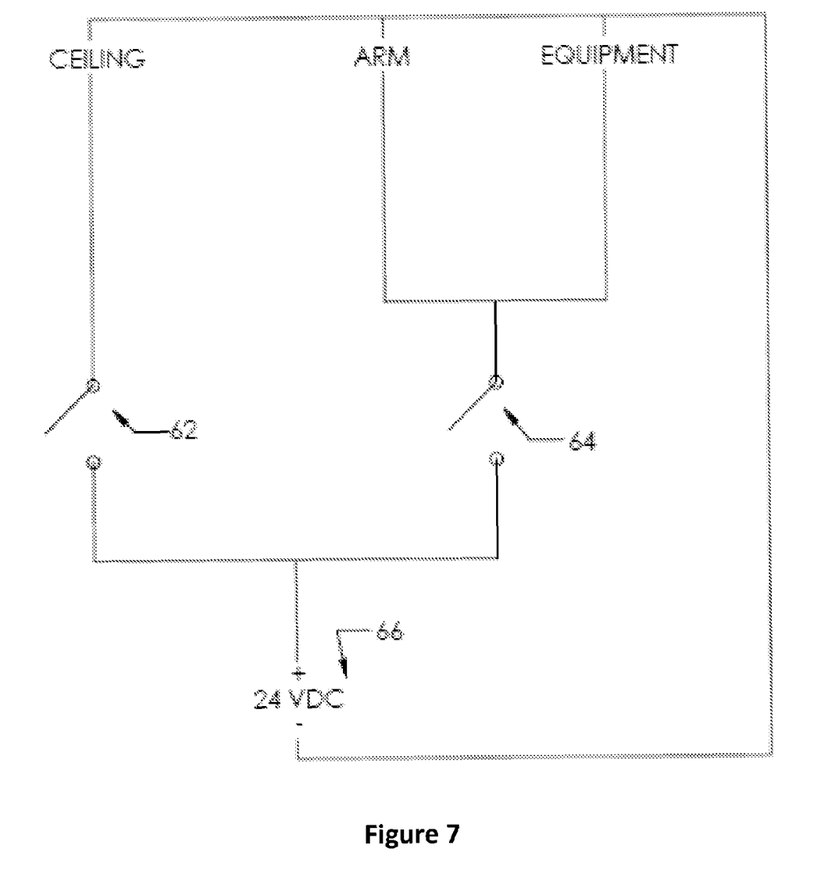
FIG. 7 is a simplified circuit diagram showing control of the various solenoids in the mechanical arm assembly.
Figure 8:
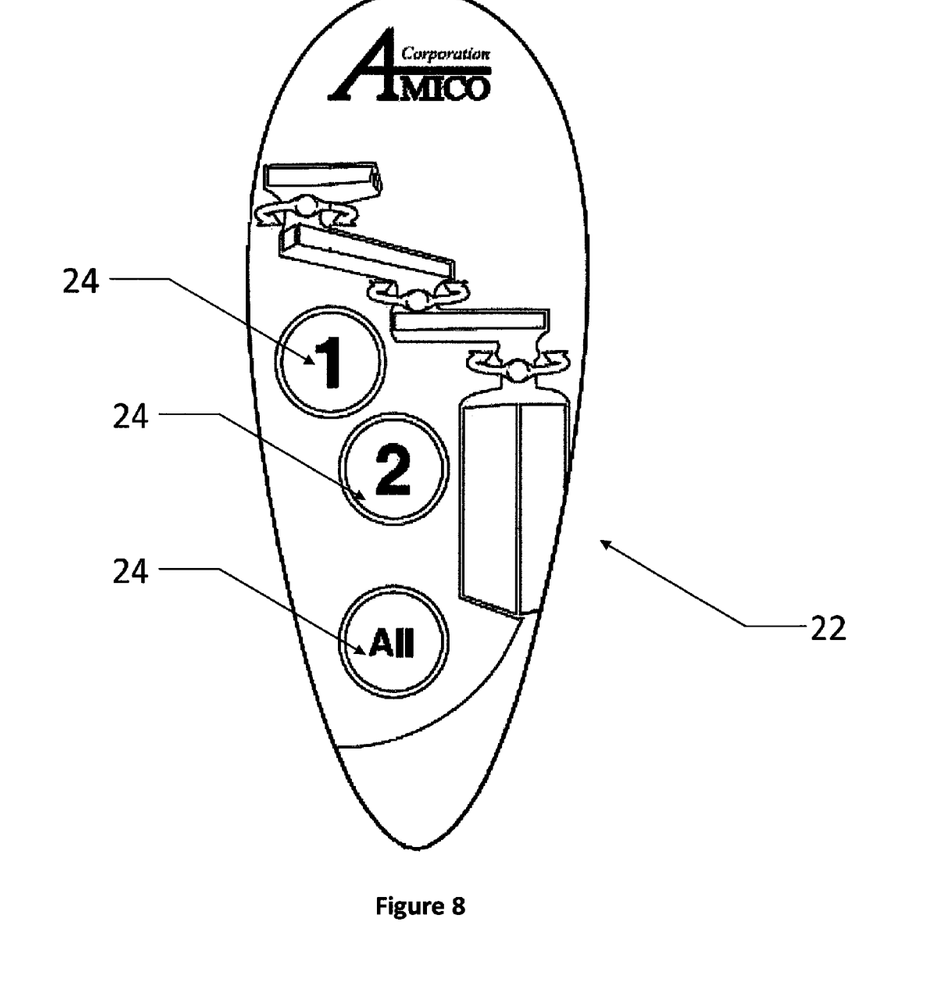
FIG. 8 is a rendering of a push button control panel for control of the arms of the mechanical arm assembly.

Control of the solenoid 54 is established with the help of a circuit as shown in the simplified circuit diagram in FIG. 7 that would be acceptable for the mechanical arm assembly 10 shown in FIGS. 1-6. This arrangement has two switches 62, 64 connected to a power supply 64. Closing the first switch 62 activates the solenoid 52 in the roller thrust bearing 20 between the ceiling 12 and the first arm 16. Closing the second switch 64 activates the solenoid 52 in the roller thrust bearing 20 between the first arm 16 and the second arm 18 and the solenoid 52 in the roller thrust bearing 20 between the second arm 18 and the piece of equipment 14. Closing both switches 62, 64 activates all of the solenoids 52 in the mechanical arm assembly 10. FIG. 8 shows a sample control panel 22 having buttons 24 that activate the solenoids 52 in the roller thrust bearings 20 of the mechanical arm assembly 10 to implement the circuit diagram of FIG. 7.

The center of the roller thrust bearing 20 is open to allow gas hoses, electrical conduit, or other hoses or cabling to be passed through and attached to the piece of equipment 14 as needed for the particular application. The piece of equipment 14 may, also include consoles that allow for accessories such as vacuum slides, IT Stations, etc. to be mounted. Mechanical arm assemblies 20 such as those described above have been manufactured by the Amico Corporation of Ontario, Canada have been built to withstand over 9,000 N.m of moment.

Figure 9:
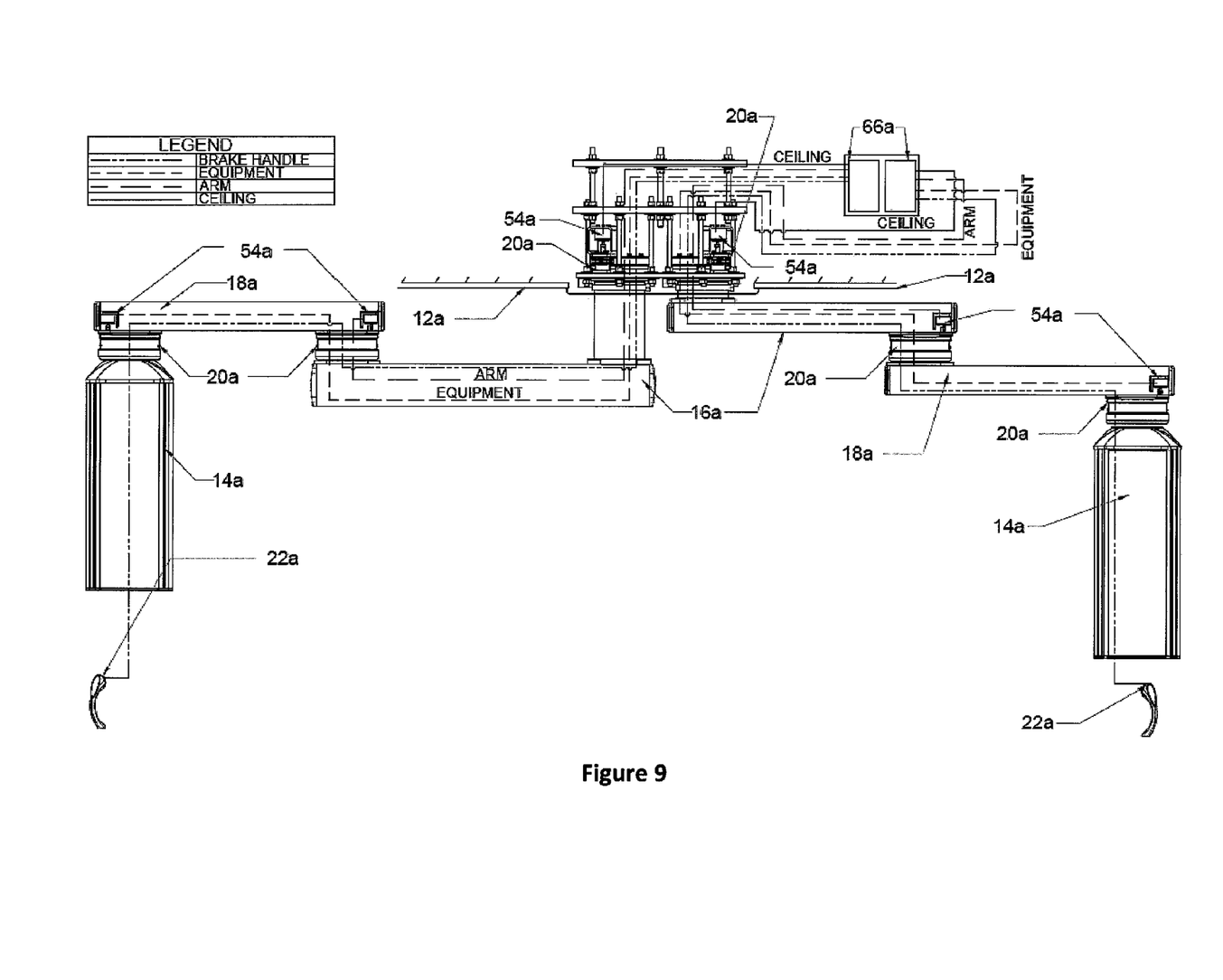
FIG. 9 is a variation of a mechanical arm assembly having tandem arms showing the wiring route for control of the solenoids.

It will be appreciated that other variations of circuits and arm assemblies are also possible. FIG. 9 shows a mechanical arm assembly 10a having tandem arm arrangement. This arrangement has two first arms 16a, two second arms 18b, and two pieces of equipment 14a. Each of these has corresponding roller thrust bearings 20a between them and the ceiling 12b as shown. FIG. 9 also shows the wiring between the arms, the equipment, the ceiling mounts, and the various solenoids 54a in each roller thrust bearing 20a connected to circuit boards and power supplies 66a for each group of arms. Other arm and circuit configurations are also possible.

Figure 10:
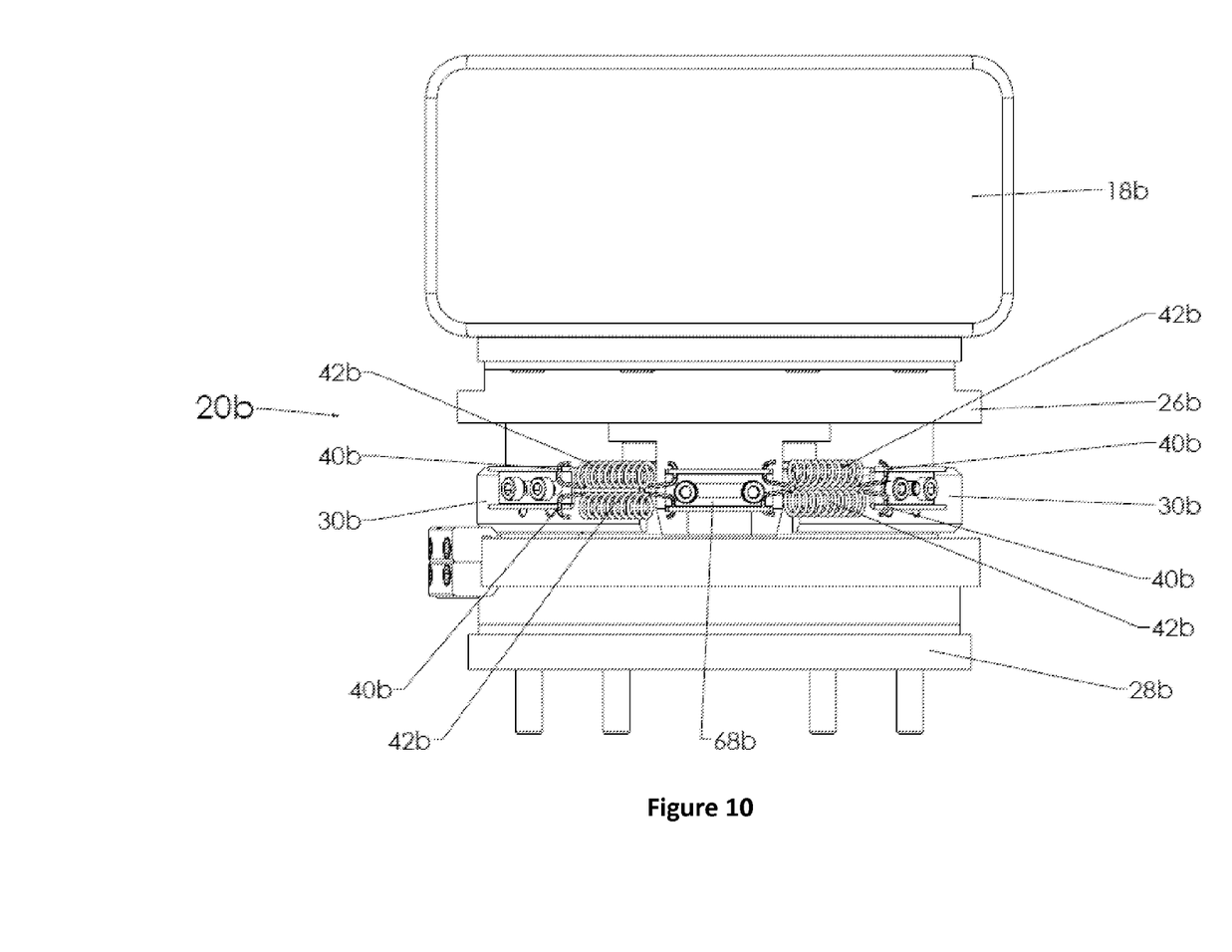
FIG. 10 is a variation of the roller thrust bearings having additional springs to hold the brake shoes.

Other configurations of roller thrust bearings are also possible. FIG. 10 shows a variation of roller thrust bearing 20b mounted to a second arm 18b in which four high tension springs 42b are used to bias the brake shoes 30b against the first bearing body 26b. A spring support body 68b is incorporated to support the additional high tension springs 42b. Each brake shoe 30b has two high tension springs 42b mounted to two spring mounting holes 40b.

This invention has been described with reference to several preferred embodiments. Many modifications and alterations will occur to others upon reading and understanding the preceding specification. It is intended that the invention be construed as including all such alterations and modifications in so far as they come within the scope of the appended claims or the equivalents of these claims.

What is claimed is:

1. A mechanical arm assembly comprising:
   a first arm having a first end and a second end;
   a first roller thrust bearing mounted to said first end and to a ceiling;
   a second roller thrust bearing mounted to said second end
   each roller thrust bearing comprising a first bearing body and a second bearing body able to rotate relative to each other, wherein the center of said roller thrust bearing is open to allow gas hoses, electrical conduit, or other hoses or cabling to be passed through, each roller thrust bearing having a solenoid powered brake comprising:

two brake shoes each with a break pad mounted to a hinge body affixed to said first bearing body;

a brake drum mounted to said second bearing body;

a tension spring pushing said brake shoes against said brake drum; and a mechanism for disengaging said brake shoes from said brake drum comprising:

a slider body with space for two pins, two ball bearings, and a plunger with sloped surfaces on one end and a mounting provision on the other end;

a solenoid attached to said mounting provision; and said sloped surface shaped such that when said solenoid is activated and said solenoid moves said plunger, said sloped surface pushes said ball bearings apart which pushes against said pins apart which in turn pushes against said brake shoes thereby disengaging said brake shoes from said brake drum and permitting said first bearing body to rotate relative to said second bearing body.

2. The mechanical arm assembly of claim 1 further comprising:

a piece of medical equipment mounted to said second roller thrust bearing.

3. The mechanical arm assembly of claim 1 further comprising a second arm having a first end and a second end;

said second arm mounted to said second roller thrust bearing at said first end of said second arm; and a third roller thrust bearing mounted to said second end of said second arm.

4. The mechanical arm assembly of claim 1 further comprising:

a second arm having a first end and a second end;

said second arm mounted to said second roller thrust bearing at said first end of said second arm;

a third roller thrust bearing mounted to said second end of said second arm; and a piece of electronic equipment mounted to said third roller thrust bearing.

5. A solenoid powered brake of a roller thrust bearing of a mechanical arm assembly, said roller thrust bearing comprising a first bearing body and a second bearing body able to rotate relative to each other, wherein the center of said roller thrust bearing is open to allow gas hoses, electrical conduit, or other hoses or cabling to be passed through, said solenoid powered bread comprising:

two brake shoes each with a brake pad mounted to a hinge body affixed to said first bearing body;

a brake drum mounted to said second bearing body;

a high tension spring pushing said brake shoes against said brake drum; and a mechanism for disengaging said brake shoes from said brake drum comprising:

a slider body with space for pins, ball bearings, and a plunger with sloped surfaces on one end and a mounting provision on the other end;

a solenoid attached to said mounting provision; and said sloped surface shaped such that when said solenoid is activated and said solenoid pushes said plunger into against said ball bearings, said sloped surface pushes said ball bearings apart which pushes against said pins which in turn pushes against said brake shoes thereby disengaging said brake shoes from said brake drum and permitting said first bearing body to rotate relative to said second bearing body.

6. The solenoid powered brake according to claim 5 in which said roller thrust bearing is mounted between a ceiling and an arm.

7. The solenoid powered brake according to claim 5 in which said roller thrust bearing is mounted between two arms.

8. The solenoid powered brake according to claim 5 in which said roller thrust bearing is mounted between an arm and a piece of electronic equipment.

\* \* \* \* \*